(12) United States Patent
Rong et al.

(10) Patent No.: US 10,258,907 B2
(45) Date of Patent: Apr. 16, 2019

(54) GRID BAR FOR A BAR SCREEN OF A FILTER UNIT, AND FILTER UNIT EQUIPPED THEREWITH

(71) Applicant: Huber SE, Berching (DE)

(72) Inventors: Oliver Rong, Berching (DE); Nikica Starcevic, Berching (DE); Simon Abt, Thalmaessing (DE)

(73) Assignee: HUBER SE, Berching (DE)

( * ) Notice: Subject to any disclaimer, the term of this patent is extended or adjusted under 35 U.S.C. 154(b) by 144 days.

(21) Appl. No.: 15/307,813

(22) PCT Filed: Apr. 24, 2015

(86) PCT No.: PCT/EP2015/058920
§ 371 (c)(1),
(2) Date: Oct. 29, 2016

(87) PCT Pub. No.: WO2015/165816
PCT Pub. Date: Nov. 5, 2015

(65) Prior Publication Data
US 2017/0050126 A1  Feb. 23, 2017

(30) Foreign Application Priority Data
Apr. 30, 2014  (DE) .................. 10 2014 106 059

(51) Int. Cl.
*B01D 29/00* (2006.01)
*B01D 29/44* (2006.01)
(Continued)

(52) U.S. Cl.
CPC .......... *B01D 29/445* (2013.01); *B01D 29/03* (2013.01); *B01D 29/6484* (2013.01); *B07B 1/12* (2013.01);
(Continued)

(58) Field of Classification Search
CPC .... B01D 29/05; B01D 29/445; B01D 29/111; B01D 29/00; B01D 29/0095; B01D 29/01;
(Continued)

(56) References Cited

U.S. PATENT DOCUMENTS

| 2,996,189 A | 8/1961 | Salterbach |
| 3,823,823 A * | 7/1974 | Dokter .................. B01D 29/01 210/110 |

(Continued)

FOREIGN PATENT DOCUMENTS

| DE | 1992838 U | 8/1968 |
| DE | 6802888 | 10/1968 |

(Continued)

OTHER PUBLICATIONS

Halley, Woodhead Publishing Limited, 2012, Rheology of thermosets: the use of chemorheology to characterise and model thermoset flow behaviour (Year: 2012).*

(Continued)

*Primary Examiner* — Allison G Fitzsimmons
(74) *Attorney, Agent, or Firm* — Dority & Manning, P.A.

(57) ABSTRACT

A grid bar for a screen grid of a screen includes a multiple number of grid bars arranged next to each other and spaced apart from each other, which serves the purpose of separating screening material from a flowing liquid, such as wastewater flowing in a sewer channel. The grid bar includes a plastic reinforced with fibers, whereas at least a part of the fibers extend in a longitudinal direction of the grid bar. A screen includes such a screen grid.

17 Claims, 8 Drawing Sheets

(51) Int. Cl.
  *E03F 5/14* (2006.01)
  *B07B 1/12* (2006.01)
  *B07B 1/46* (2006.01)
  *B01D 29/03* (2006.01)
  *B01D 29/64* (2006.01)
  *E02B 8/02* (2006.01)
  *E02B 8/00* (2006.01)

(52) U.S. Cl.
  CPC ............ *B07B 1/4618* (2013.01); *E02B 8/023* (2013.01); *E03F 5/14* (2013.01); *B01D 2029/033* (2013.01); *B07B 1/4609* (2013.01)

(58) Field of Classification Search
  CPC .................. B01D 29/012; B01D 29/64; B01D 2029/0033; B01D 2029/075; B07B 1/4609; B07B 1/00; B07B 1/02; B07B 1/12
  USPC .................. 210/483, 499; 428/364, 365, 373
  See application file for complete search history.

(56) References Cited

U.S. PATENT DOCUMENTS 5,470,656 A * 11/1995 Kennard ............... B29C 47/003
  428/370
2004/0241415 A1 * 12/2004 Wadahara ............. B29C 70/226
  428/298.1
2005/0236305 A1 * 10/2005 Schulte, Jr. .......... B01D 29/012
  209/403
2013/0149521 A1 * 6/2013 Nelson .................. B29C 70/081
  428/221

FOREIGN PATENT DOCUMENTS

| | | |
|---|---|---|
| DE | 2340093 A1 | 2/1975 |
| DE | 202005019791 U1 | 4/2006 |
| DE | 102010037223 A1 | 3/2011 |
| EP | 0703010 A1 | 3/1996 |
| EP | 0908214 A2 | 4/1999 |
| RU | 2224851 C2 | 2/2004 |

OTHER PUBLICATIONS

German Search Report, dated Feb. 13, 2015.
Translation of International Preliminary Report on Patentability, dated Nov. 10, 2016.
Chinese Office Action (201580021708.8). dated Aug. 3, 2018 (English translation).
Russian Office Action, 2016146542/13(074695), dated Jul. 24, 2018, 19 Pages.

* cited by examiner

GRID BAR FOR A BAR SCREEN OF A FILTER UNIT, AND FILTER UNIT EQUIPPED THEREWITH

FIELD OF THE INVENTION

The present invention relates to a grid bar for a screen grid of a screen, which serves the purpose of separating screening material from a flowing liquid, such as wastewater flowing in a sewer channel. Moreover, a screen for separating and removing screening material from a flowing liquid, such as that from wastewater flowing in a sewer channel, is described.

BACKGROUND OF THE INVENTION

Grid bars conforming to this type and screens that are thus equipped are known in the prior art and are used, for example, for the removal of coarse screening material from wastewater flowing in a sewer channel. For this purpose, the screen grid comprising grid bars is integrated in the sewer channel in such a manner that the screen surface formed by the grid bars, starting from a channel bottom of the sewer channel, extend in a direction that is vertical or slightly tilted upward. Finally, for removing the screening material retained by the screen grid, one or more cleaning elements may be present, which may be moved with the assistance of a drive relative to the screen grid, in order to remove the screening material from the screen grid.

In order to ensure the necessary strength and bending stiffness of the individual grid bars, the known grid bars are manufactured from a metal, for example stainless steel. Therefore, the production of the grid bars is correspondingly cost-intensive.

SUMMARY OF THE INVENTION

The task of this invention is to propose a grid bar for a corresponding screen, which is characterized by a particularly high stability, despite relatively low production costs.

The task is solved by a grid bar with the characteristics described below.

In accordance with the invention, the grid bar is characterized in that it consists, at least partially, of a plastic reinforced with fibers, whereas at least a majority of the fibers extend in a longitudinal direction of the grid bar. Thus, the grid bar has an elongated shape that preferably runs in a straight line, and a plurality of fibers, which extend in the longitudinal direction, that is, in the direction of the largest extension of the grid bar. The fibers may comprise, for example, glass fibers or carbon fibers or a mixture thereof (of course, other fibers, for example made of metal, are not excluded; the term "fiber" merely states that it comprises an elongated and thin structure that runs through the grid bar, preferably over its entire length).

The fibers are surrounded by plastic, preferably a plastic resin, or are embedded in the plastic that desirably is contiguous apart from being interrupted by the presence of the fibers. Thereby, the screen grid receives a sufficiently high bending stiffness and thus can be applied, together with additional grid bars, in a screen grid of a screen. The plastic may comprise, for example, a vinyl ester resin or a polyester resin, or mixtures of different plastics or plastic resins.

Of course, in addition to the plastic and the specified fibers, additional components may be present. Fillers or additives (for example), with the assistance of which the physical properties of the grid bar or its surface can be positively influenced, are conceivable.

The grid bars are finally connected to each other in a screen prior to installation and thus form one unit, whereas, between adjacent ones of the grid bars, which preferably run parallel, a slot is formed, through which the liquid to be screened may pass through, while screening material that is larger than the slot width is retained by the screen grid.

The screen grid comprising the individual grid bars may be positioned, for example, as component of a wastewater screen within the sewer channel, in order to remove coarse screening material (especially impurities) from the wastewater. It is also conceivable to integrate the screen grid in man-made or natural water channels, such as rivers, in order to, for example, remove impurities from the water in front of weirs or in water intake areas of power plants.

In any event, it is advantageous if at least the majority of the fibers, preferably all fibers, extend continuously between two end faces bounding the grid bar in its longitudinal direction. In particular, the grid bar, and thus the individual fibers, may have a length of over one meter. The end faces may also feature a protective layer, such that the fiber ends are not accessible from the outside and are thus protected, whereas the specified protective layer is preferably present as a plastic (resin) layer and may be only a few millimeters thick.

It is particularly advantageous if at least the majority of the fibers run parallel to the longitudinal direction of the grid bar and/or parallel to each other. Herein the individual fibers are at least partially surrounded by a plastic resin (whereas the plastic resin referred to in the description or the claims in several places is, of course, cured). The fibers are also preferably embedded in the plastic resin in such a manner that they are not accessible from the outside and are thus protected from mechanical contact with the screening material present in the liquid to be screened.

It is particularly advantageous if at least a part of the fibers has a fineness of at least 300 tex, preferably at least 500 tex (whereas one "tex" corresponds to the linear mass density of one gram per 1000 meters of the particular fiber). If the value is under 300 tex, the tensile strength of the individual fibers would be very low, such that an excessively high number of individual fibers would have to be used. Finally, it is advantageous if the fineness of respective fibers is constant in the longitudinal direction of the grid bar.

It is also extremely advantageous if the ratio between the mass of the fibers and the total mass of the grid bar is at least 0.4, preferably at least 0.5, more preferably at least 0.6. From a value of 0.4, the corresponding grid bar features a strength or bending stiffness that is sufficiently high for most applications. The ratio is preferably constant over the entire extension of the grid bar running lengthwise. However, the ratio may fluctuate in a direction perpendicular to the longitudinal direction, whereas, in particular in the area of a front side and/or a back side of the grid bar, it may be advantageous if this ratio has a higher value than the value of the ratio in the remaining area of the grid bar.

It is also advantageous if the grid bar comprises a plurality of individual fiber bundles, whereas each of the individual fiber bundles comprises fibers located close to each other and is embedded in a plastic resin, which desirably is contiguous apart from being interrupted by the presence of the fiber bundles. The individual fibers of a fiber bundle may extend parallel to each other or run in a manner twisted together. The same applies to the individual fiber bundles. The number of fiber bundles per grid bar should amount to between 10 and 200, preferably between 40 and 100.

It is particularly advantageous if additional reinforcing elements are arranged at least in the interior of the grid bar, whereas the fibers and the reinforcing elements are embedded in a plastic resin, which desirably is contiguous apart from being interrupted by the presence of the reinforcing elements and the fiber bundles. The reinforcing elements may comprise individual fibers oriented randomly or in parallel to the longitudinal direction of the grid bar, whereas the reinforcing elements are to be arranged between the individual fibers and the respective fiber bundles. Likewise, reinforcing fibers in the form of fabrics or non-woven materials can be used. The mass or volume ratio of fibers or fiber bundles to reinforcing elements are also to be constant in the longitudinal direction of the grid bar, or fluctuate by a maximum of 5%.

It is particularly advantageous if the reinforcing elements are formed by one or more bulk materials. In particular, the reinforcing elements may be made of plastic, metal or glass (it would also be conceivable to use internally hollow glass spheres). The maximum diameter of the respective bulk material is preferably between 1 micron and 150 microns. In addition, the bulk material may be formed in a spherical shape. Preferably, the grid bar finally contains between 0.01 and 10 kg of reinforcing elements per 100 kg of plastic resin (preferably, a value between 0.1 and 5 kg of the reinforcing elements per 100 kg of plastic resin).

It is also advantageous if the grid bar has two side sections running in its longitudinal direction, one front side running in the longitudinal direction and also one back side running in the longitudinal direction, whereas the grid bar features an additional reinforcement at least in the area of the front side (into which, after installation in a screen, a liquid and the screening material contained therein flows) and/or in the area of the back side, which is opposite the front side. The reinforcement may be formed, for example, by individual reinforcing fibers that preferably run in the longitudinal direction of the grid bar and are internal, whereas the reinforcing fibers may also be present in the form of individual fiber bundles. The reinforcing fibers may differ from the fibers specified above with respect to the material or fineness. It is also conceivable that additional fibers that do not differ from the other fibers with respect to fineness and material are used as reinforcing fibers. In this case, in the area of the front and/or the back side of the grid bar, the number of fibers per cross-sectional area would be higher than in an intermediate region in between the front side and the back side. In any event, the corresponding fibers/reinforcing fibers cause a reinforcement of the respective areas, such that mechanical wear during use in a screen grid can be minimized.

It is particularly advantageous if the grid bar features, at least in sections, an outer protective layer, which surrounds, at least in sections, the inner core comprising the fibers. The protective layer may be arranged, for example, in the area of the front side specified above and/or the adjoining side sections, and preferably extends over the entire longitudinal extension of the grid bar. Further, it is conceivable that the protective layer is formed in one layer or multiple layers. In particular, the protective layer should have a hardness or abrasion resistance greater than the plastic resin surrounding the fibers of the grid bar.

It is also advantageous if the protective layer comprises at least one non-woven material and/or one fabric, whereas the protective layer is preferably embedded in a plastic resin. For example, it would be conceivable to use a non-woven material or a fabric based on glass fiber. The fabric or non-woven material used preferably has a surface weight of at least 50 grams per square meter, whereas the surface weight is preferably constant in the longitudinal direction of the grid bar.

Finally, the screen in accordance with the invention is characterized in that it comprises a screen grid, the grid bars of which consist at least partially of a plastic reinforced with fibers, whereas at least a part of the fibers extend in the longitudinal direction of the grid bars. With respect to possible additional forms of the individual grid bars, reference is made to the previous or following description, whereas the respective features may be implemented individually or in any combination (to the extent that there is no conflict in this regard).

In particular, the screen may comprise a wastewater screen, which may be integrated, for example, in a sewer channel, in order to screen from the wastewater screening material brought along in the wastewater. The use of the screen for cleaning river water in the area of a water inlet of a power plant or in the area of corresponding accumulating or collecting devices of natural or artificial water channels is also conceivable.

In any event, it is advantageous if the screen comprises a drive and at least one cleaning element that is movable relative to the screen grid with the assistance of the drive, with the assistance of which screening material retained by the screen grid can be removed from the screen grid and can be conveyed in the direction of a discharge of the screen. The cleaning element may comprise, for example, a cleaning rake that is movable circumferentially around the screen grid, the cleaning teeth of which engage in the gaps existing between the grid bars and move the retained screening material along the screen grid, in order to thereby free it of the screening material.

Additional objects and advantages of the invention will be set forth in part in the following description, or may be obvious from the description, or may be learned through practice of the invention.

BRIEF DESCRIPTION OF THE DRAWINGS

Additional advantages of the invention are described in the following embodiments. The following is shown, in each case schematically.

DETAILED DESCRIPTION

Figure 1:
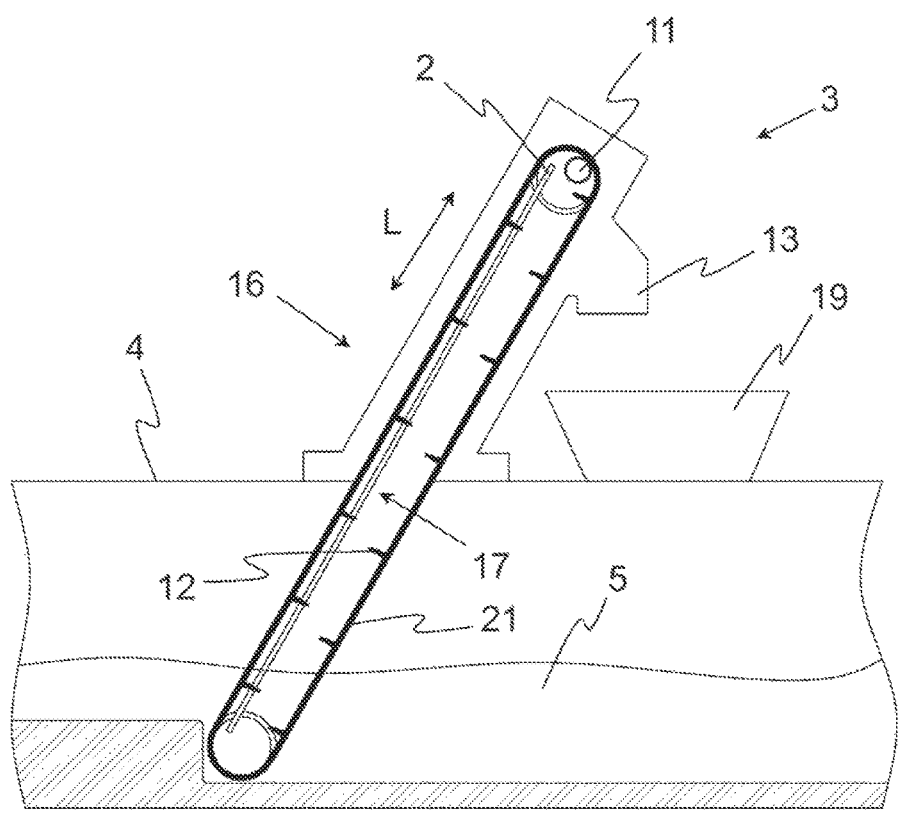
FIG. 1 a side view of a possible embodiment of a screen in accordance with the invention, FIG. 2 a perspective of a screen grid, FIG. 3 a front view of a grid bar in accordance with the invention, FIGS. 4 to 6 sectional views of various embodiments of the grid bar in accordance with the invention, cut along a section plane running perpendicular to the longitudinal direction, and FIG. 7 a perspective of an additional grid bar in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

It must be noted in advance that, in figures that show several similar (that is, drawn the same) components, only one of multiple similar components is provided with a reference sign, in order to ensure the necessary clarity.

FIG. 1 shows an example of a screen 3 according to the invention, which is integrated into a sewer channel 4 and is used for separating and removing screening material (in the form of stones, branches, etc.) from wastewater 5 flowing in a sewer channel 4.

Figure 2:
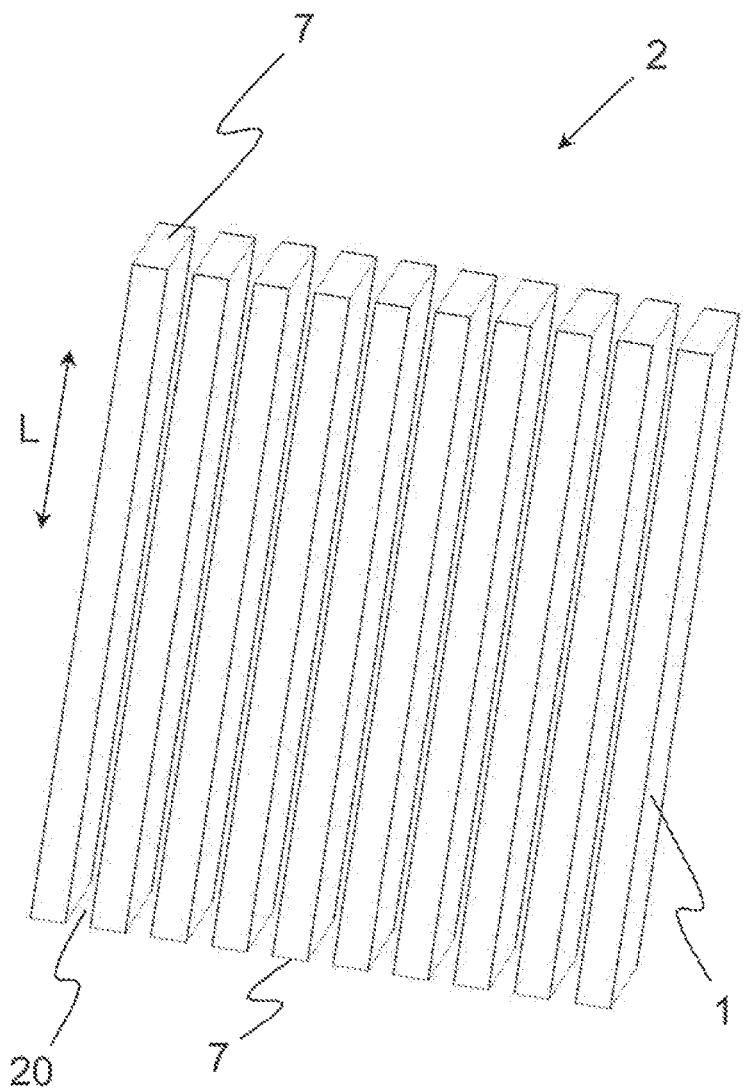

The screen 3 features a screen grid 2 projecting in the sewer channel 4 obliquely from the top, which is connected by fastening elements (not shown) to the channel wall of the sewer channel 4 or a support structure of the screen 3. The screen grid 2 in turn comprises, as shown in FIG. 2, plurality of grid bars 1 that are adjacent to each other (whereas the individual grid bars 1 are, of course, connected to each other in a manner that is not more specifically shown, in order to form a stable unit).

Gaps 20 ultimately arise between the individual grid bars 1, such that the wastewater 5 and minor impurities can pass through the gaps 20 and thus through the screen grid 2. By contrast, larger screening material is retained by the grid bars 1, such that, as a result, the screen 3 effects a cleaning of the wastewater 5.

In order to remove the retained screening material from the screen grid 2, the screen 3 features one or more cleaning elements 12, which are schematically depicted in FIG. 1 and movable relative to the screen grid 2 with the assistance of a drive 11. For example, the cleaning elements 12 are present in the form of comb-like cleaning rakes, the individual cleaning teeth of which grasp (engage) in or through the specified gaps 20 of the screen grid. The cleaning elements 12 may move by means of, for example, two circulating chains 21 that run parallel and can be driven in a circulating manner with the assistance of a drive 11.

The screening material retained by the screen grid 2 (in FIG. 1, the wastewater flow runs from left to right) is ultimately captured by the cleaning elements 12 and conveyed upwards. There, it enters the area of a discharge 13, and from there enters the outside, for example a corresponding container 19.

Figure 3:
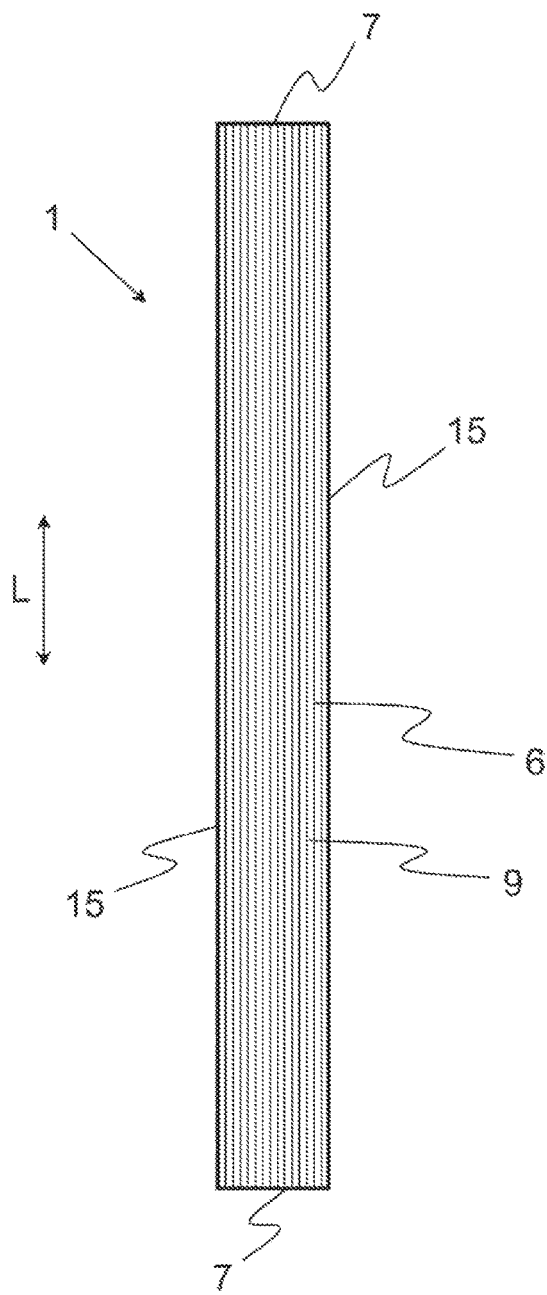

FIG. 3 shows a front view of a possible embodiment of a grid bar 1 in accordance with the invention of the screen grid 2 described above. As this figure schematically shows, the grid bar 1 comprises a plurality of fibers 6 running in the longitudinal direction L of the same, which are embedded in a plastic resin 9, which can be composed of, for example, a vinyl ester resin or a polyester resin, or mixtures of different plastics or plastic resins. The plastic resin 9 may cover the entire outer surface of the grid bar 1, such that the fibers 6, which serve the purpose of stabilizing the grid bar 1, are arranged in a manner protected in the interior of the grid bar 1.

The individual fibers 6 preferably run parallel to each other and extend between the two opposing end faces 7 which bound bounding the opposite ends of the grid bar 1 in the longitudinal direction L.

Figure 4:
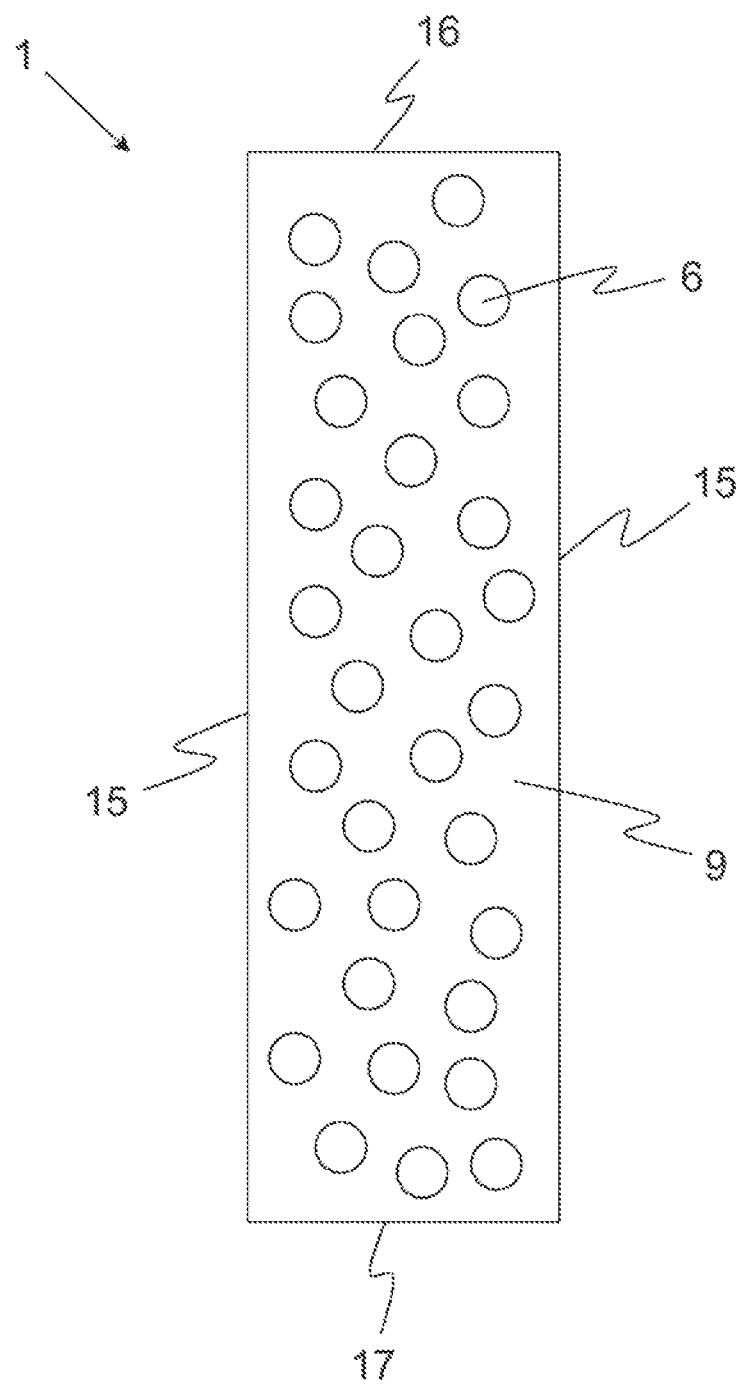

FIG. 4 shows a cross-section of the grid bar 1 in accordance with the invention, cut along a section plane perpendicular to the longitudinal direction L of the corresponding grid bar 1. In the embodiment shown, the outer perimeter of the grid bar 1 has a rectangular cross-section. In addition, the fibers 6 are distributed in an essentially uniform manner over the cross-sectional area with the same number of fibers 6 on average per unit of area, and are each completely embedded in the plastic resin 9, which desirably is contiguous except for being interrupted by the presence of the fibers 6.

Figure 5:
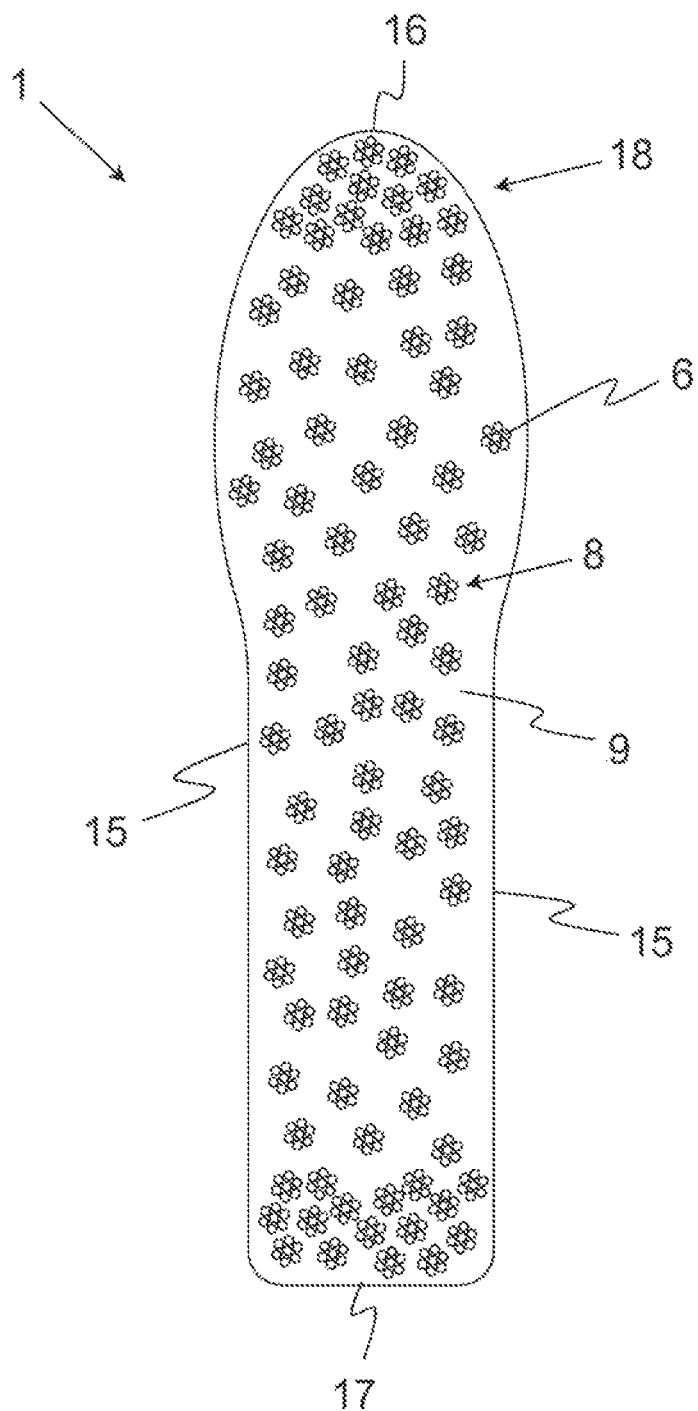

It would also be possible to arrange the fibers 6 in the form of individual fiber bundles 8, as shown in FIG. 5. The fibers 6 of the respective fiber bundle 8 may abut each other or be spaced slightly apart from each other. Likewise, the number of the fibers 6 per fiber bundle 8 may vary, whereas the fiber bundles 8 preferably have the same number of fibers.

Furthermore, FIG. 5 shows that the cross-section of the outer perimeter of the grid bar 1 need not necessarily be rectangular. Rather, this cross-section of the outer perimeter may also be formed in an oval shape or a shape that is curved in sections. It is particularly advantageous if the grid bar 1 features a thickening in the area of its front side 16, such that the retained screening material collects in the area of the front side 16 (since, here, the corresponding gaps 20 are the smallest between adjacent grid bars 1) and is thus accessible from the front or is cleanable with the assistance of the cleaning element(s) 12. In addition, the form of the front side 16 shown in FIG. 5 enables a flow-optimized flowing past of the respective liquid, such that the wear of the surface of the grid bar 1 can be minimized.

It is also conceivable to, in the area of the front side 16 and/or the shown back side 17, increase the fiber density (that is, the number of fibers 6 per cross-sectional area) compared to an intermediate region of the grid bar 1 placed between the front side 16 and the back side 17. This non-uniform density profile for placement of the fibers 6 or fiber bundles 8 ultimately leads to an increase in the strength of the specified areas that, in the operation of the screen 3, given the retained screening material or the cleaning elements 12 moved relative to the screen grid 2, are exposed to a particularly high mechanical load. The fiber density may be increased in the specified area, in particular through the provision of additional reinforcing fibers 18, whereas the nature and fineness of all of the fibers 6 used may be identical.

Figure 6:
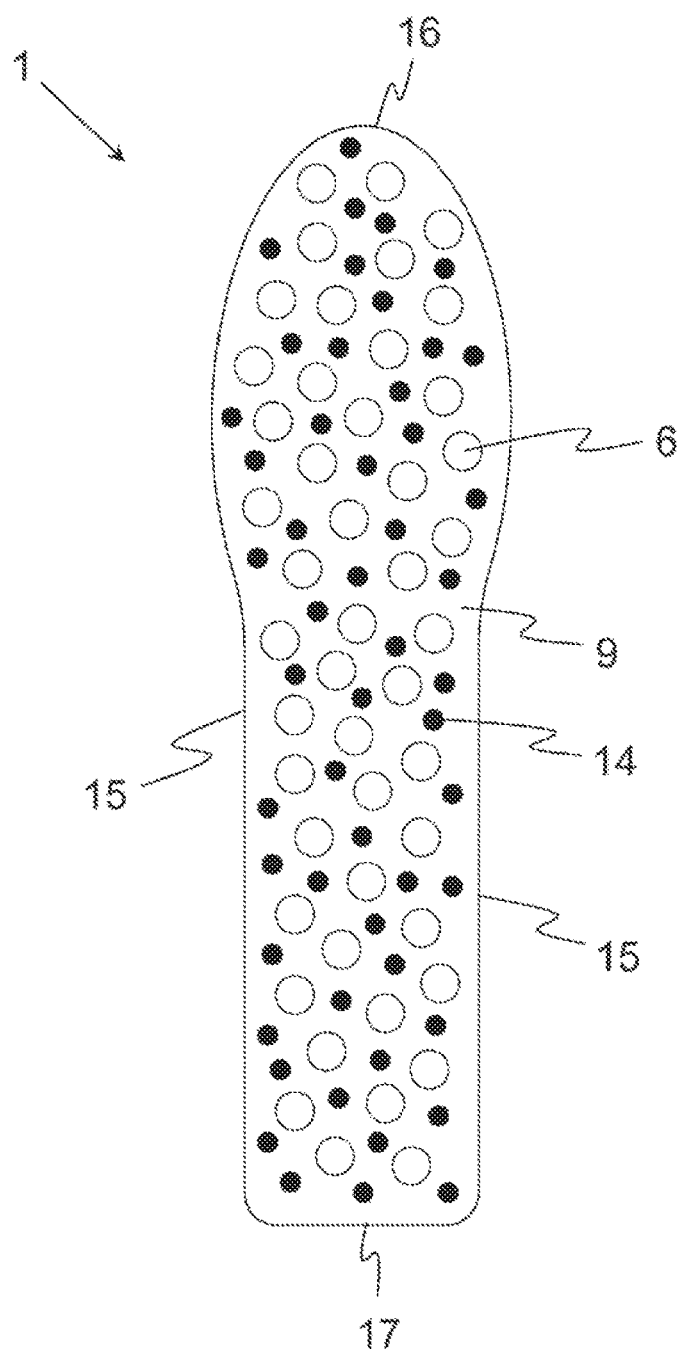

Alternatively or additionally, it may also be advantageous to arrange individual reinforcing elements 14 between the respective fibers 6 or the individual fiber bundles 8, that is, to embed them in the plastic resin 9 as schematically shown in FIG. 6 for example. The reinforcing elements 14 may comprise, for example, a bulk material (for example, made of glass), whereas the concentration of the bulk material in the area of the front side 16 and/or the back side 17 may be higher than the intermediate central area or the two side sections 15 of the grid bar 1.

Figure 7:
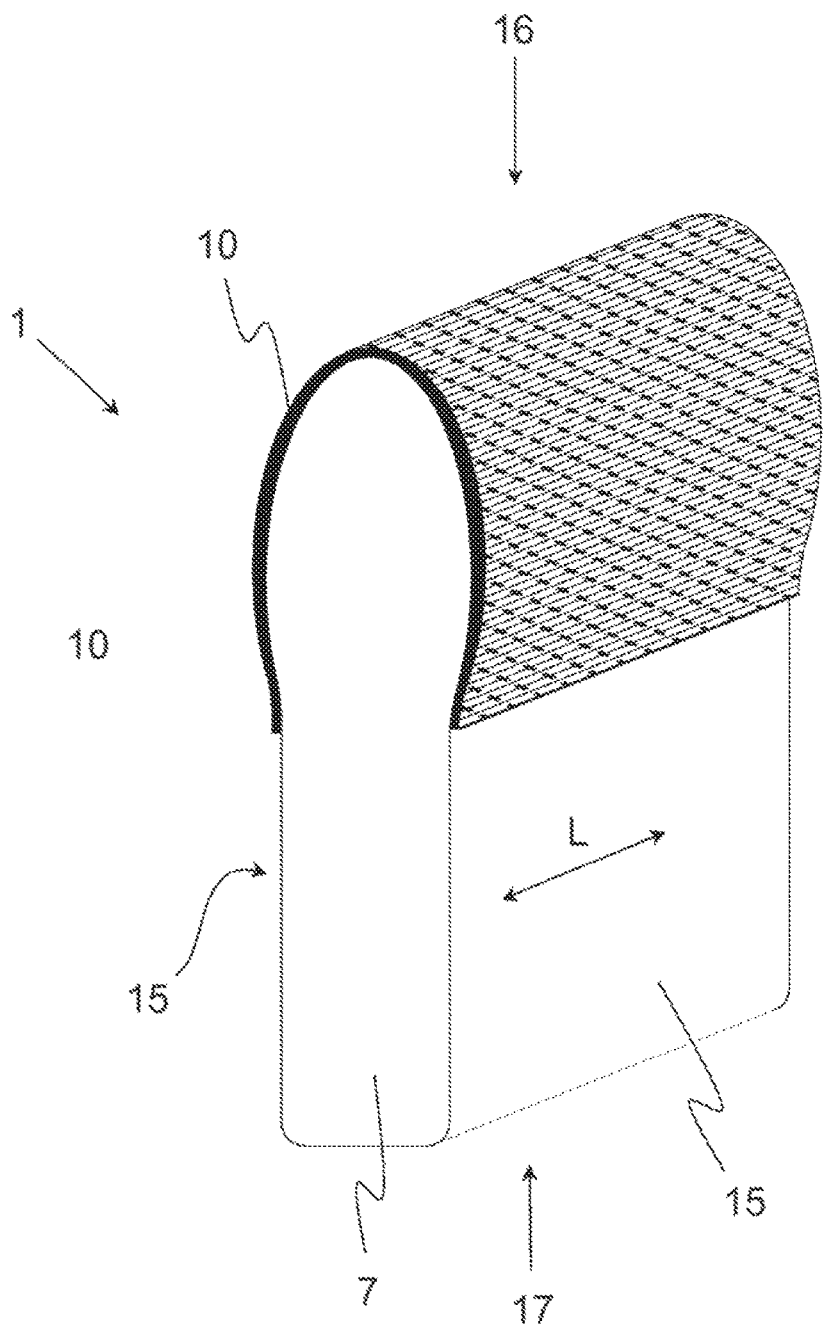
Figure 8:
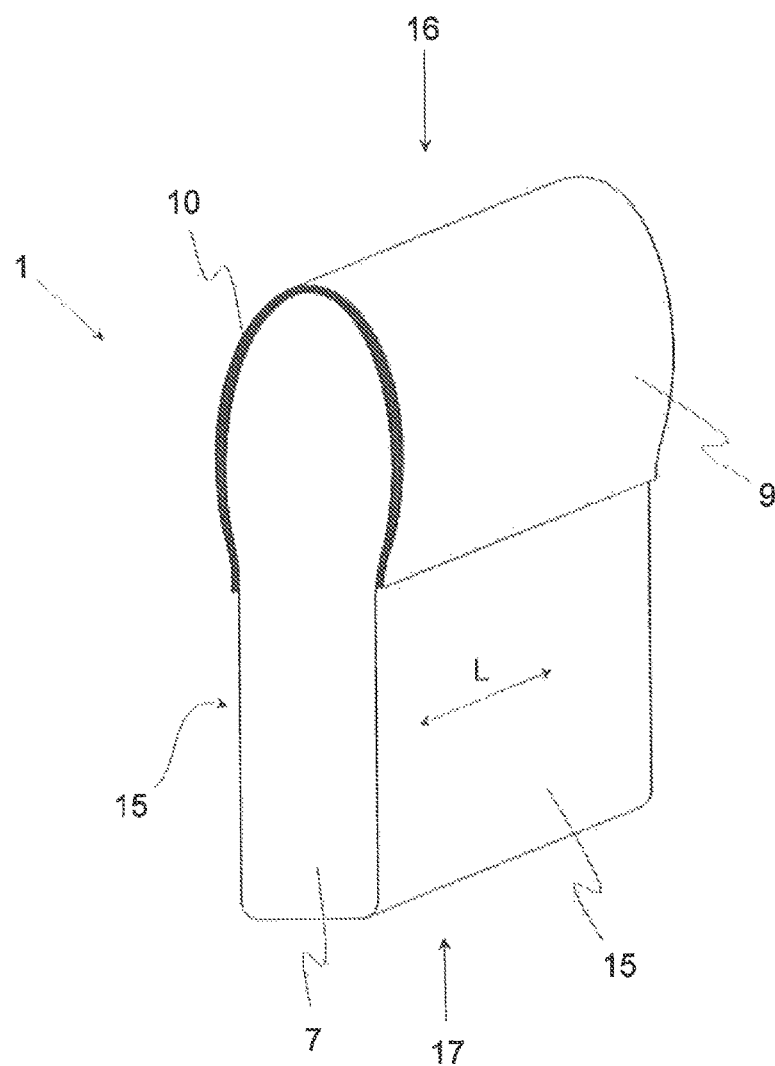
FIG. 8 a perspective of an additional grid bar in accordance with the invention.

Finally, FIG. 7 schematically shows that it may be advantageous if the grid bar 1 features a protective layer 10. The protective layer 10 may be formed, for example, in one or more layers, and preferably comprises one or more fabrics and/or one or more layers of non-woven materials. The existing fabric or non-woven material may be applied externally as schematically depicted in FIG. 7 for example or embedded in an outer plastic resin 9 as schematically depicted in FIG. 8 for example (of course, each of the embodiments shown in FIGS. 7 and 8 also has corresponding fibers 6, which are not explicitly shown).

This invention is not limited to the illustrated and described embodiments. Variations in the claims, such as any combination of the described characteristics, are also possible, even if they are presented and described in different parts of the description and/or the claims, or in different embodiments.

LIST OF REFERENCE SIGNS

1 Grid bar
2 Screen grid

3 Screen
4 Sewer channel
5 Wastewater
6 Fiber
7 End face
8 Fiber bundle
9 Plastic resin
10 Protective layer
11 Drive
12 Cleaning element
13 Discharge
14 Reinforcing element
15 Side section
16 Front side
17 Back side
18 Reinforcing fiber
19 Container
20 Gap
21 Circulating chain
L Longitudinal direction

The invention claimed is:

1. A screen grid of a screen for separating and removing bulk screening material from a flowing liquid, the screen grid occupying generally a longitudinal dimension and a transverse dimension disposed perpendicular to the longitudinal dimension, and with the longitudinal dimension being longer than the transverse dimension, the screen grid comprising:
a plurality of grid bars arranged next to each other and spaced apart from each other, which serves the purpose of separating screening material from the flowing liquid, each grid bar being defined in part by a front side and a back side spaced apart in the longitudinal dimension from the front side, each grid bar extending parallel to one another in the longitudinal dimension; and
wherein each grid bar includes, at least partially, a plastic reinforced with a plurality of fibers, whereas at least a majority of the plurality of fibers are arrayed with their lengths extending parallel to one another in the longitudinal dimension of the grid bar; and
wherein each grid bar of the plurality of grid bars includes an outer protective layer formed of at least one woven fabric embedded in a plastic resin and covering at least a portion of the front side.

2. Screen grid according to claim 1, wherein each grid bar defines a first end spaced apart in the screen grid's longitudinal dimension from a second end disposed opposite the first end;
wherein each grid bar defines a first end face that bounds the first end of the grid bar;
wherein each grid bar defines a second end face that bounds the second end of the grid bar; and
wherein in each grid bar at least a majority of the fibers extend continuously between the first and second end faces of the grid bar and along substantially the entire distance between the first and second end faces of the grid bar.

3. Screen grid according to claim 1, wherein each of at least a majority of the fibers in each of the plurality of grid bars runs parallel to one another in the longitudinal dimension of the grid bar and parallel to each other.

4. Screen grid according to claim 1, wherein at least a plurality of the fibers has a fineness of at least 300 tex.

5. Screen grid according to claim 1, wherein at least a plurality of the fibers has a fineness of at least 500 tex.

6. Screen grid according to claim 1, wherein the ratio between the total mass of each respective grid bar and the total mass of just the fibers in that respective grid bar is at least 0.4.

7. Screen grid according to claim 1, wherein the ratio between the total mass of each respective grid bar and the total mass of just the fibers in that respective grid bar is at least 0.5.

8. Screen grid according to claim 1, wherein the ratio between the total mass of each respective grid bar and the total mass of just the fibers in that respective grid bar is at least 0.6.

9. Screen grid according to claim 1, wherein each grid bar includes a plurality of individual fiber bundles, whereas each of the individual fiber bundles includes a plurality of fibers located close to each other and whereas the plurality of individual fiber bundles is embedded in a contiguous plastic resin.

10. Screen grid according to claim 1, wherein each of the plurality of grid bars includes a plurality of reinforcing elements dispersed among the individual fibers in the plurality of fibers, whereas the fibers and the reinforcing elements are embedded in a contiguous plastic resin.

11. Screen grid according to claim 10, wherein the reinforcing elements are formed by a bulk material.

12. Screen grid according to claim 1, wherein each grid bar of the plurality of grid bars has two side sections forming its longitudinal dimension, one front side forming the longitudinal dimension and also one back side also forming the longitudinal dimension, wherein each grid bar of the plurality of grid bars includes an additional reinforcement at least in the area of the front side, whereas the additional reinforcement is formed by individual reinforcing fibers that run in the longitudinal dimension of the grid bar.

13. Screen grid according to claim 1, wherein each grid bar of the plurality of grid bars has two side sections forming its longitudinal dimension, one front forming the longitudinal dimension and also one back side also forming the longitudinal dimension, whereas wherein each grid bar of the plurality of grid bars includes an additional reinforcement at least in the area of the back side, whereas the additional reinforcement is formed by individual reinforcing fibers that run in the longitudinal dimension of the grid bar.

14. Screen grid according to claim 1, wherein each grid bar of the plurality of grid bars has two side sections forming its longitudinal dimension, one front side forming the longitudinal dimension and also one back side also forming the longitudinal dimension, whereas wherein each grid bar of the plurality of grid bars includes an additional reinforcement at least in the area of the front side and in the area of the back side, whereas the additional reinforcement is formed by individual reinforcing fibers that run in the longitudinal dimension of the grid bar.

15. Screen grid according to claim 1, wherein the outer protective layer includes at least one non-woven material embedded in the plastic resin.

16. Screen for separating and removing screening material from a flowing liquid, such as that from wastewater flowing in a sewer channel, the screen comprising:
a screen grid for separating and removing bulk screening material from a flowing liquid, the screen grid occupying generally a longitudinal dimension and a transverse dimension disposed perpendicular to the longitudinal dimension, and with the longitudinal dimension being longer than the transverse dimension, the screen grid including a plurality of grid bars arranged parallel next to each other and spaced apart from each other, each grid bar being defined in part by a front side and a back side spaced apart in the longitudinal dimension from the front side, each grid bar includes an outer protective layer formed of at least one woven fabric embedded in a plastic resin and covering at least a portion of the front side; and wherein at least each of a plurality of the grid bars includes a plastic reinforced with a plurality of fibers, whereas at least a majority of the plurality of fibers are arrayed with their lengths extending parallel to one another in the longitudinal dimension of the grid bar.

17. Screen according to the claim 16, wherein the screen includes:

a drive and at least one cleaning element that is movable relative to the screen grid with the assistance of the drive and with the assistance of which cleaning element screening material retained by the screen grid can be removed from the screen grid and can be conveyed in the direction of a discharge of the screen.

\* \* \* \* \*